United States Patent
Hanke

(10) Patent No.: US 9,648,572 B2
(45) Date of Patent: May 9, 2017

(54) POWER REGULATION IN RADIO-FREQUENCY TRANSMITTERS

(75) Inventor: André Hanke, Neubiberg (DE)

(73) Assignee: Intel Deutschland GmbH, Neubiberg (DE)

( * ) Notice: Subject to any disclaimer, the term of this patent is extended or adjusted under 35 U.S.C. 154(b) by 1572 days.

(21) Appl. No.: 11/594,567

(22) Filed: Nov. 8, 2006

(65) Prior Publication Data

US 2007/0109863 A1 May 17, 2007

Related U.S. Application Data

(63) Continuation-in-part of application No. PCT/DE2005/000843, filed on May 4, 2005.

(30) Foreign Application Priority Data

May 12, 2004 (DE) .................. 10 2004 023 441

(51) Int. Cl.
*H01Q 11/12* (2006.01)
*H04W 52/52* (2009.01)

(52) U.S. Cl.
CPC .................. *H04W 52/52* (2013.01)

(58) Field of Classification Search
CPC ............ H01Q 1/2225; G06K 19/0707; G06K 19/0712
USPC .................. 455/126; 330/298, 207
See application file for complete search history.

(56) References Cited

U.S. PATENT DOCUMENTS

| | | | |
|---|---|---|---|
| 5,196,808 A * | 3/1993 | Pickett et al. ................. | 330/298 |
| 5,257,407 A * | 10/1993 | Heinzelmann ......... | H04B 17/20 |
| | | | 455/226.1 |
| 5,548,616 A | 8/1996 | Mucke et al. | |
| 6,532,358 B1 * | 3/2003 | Earls et al. ................. | 455/234.1 |
| 6,731,694 B2 * | 5/2004 | Bozeki et al. ................. | 375/297 |
| 7,079,043 B2 * | 7/2006 | O'Toole et al. ......... | 340/825.36 |
| 7,103,029 B1 * | 9/2006 | Minowa ........................ | 370/342 |
| 7,602,818 B2 * | 10/2009 | Dao et al. ..................... | 370/535 |
| 2004/0253936 A1 | 12/2004 | Simon | |

FOREIGN PATENT DOCUMENTS

| | | |
|---|---|---|
| DE | 101 32 587 A1 | 11/2002 |
| DE | 102 34 657 A1 | 2/2004 |
| EP | 0 982 849 A1 | 3/2000 |
| GB | 2 330 960 A | 5/1999 |
| WO | WO 2004/014530 A1 | 2/2004 |

OTHER PUBLICATIONS

Nary et al., "An MMIC Amplifier for Automatic Level Control Applications," *IEEE Microwave and Millimeter-Wave Monolithic Circuits Symposiums*, 1990, pp. 73-76.

* cited by examiner

*Primary Examiner* — Mohammed Rachedine
(74) *Attorney, Agent, or Firm* — Eschweiler & Potashnik, LLC

(57) ABSTRACT

An apparatus for regulation of the signal power of a transmitter includes a control loop. The control loop includes a controlled module, a voltage detector, an evaluation circuit and an input amplification module. A decoupling module decouples the output of the control loop from a downstream electrical load.

42 Claims, 1 Drawing Sheet

POWER REGULATION IN RADIO-FREQUENCY TRANSMITTERS

PRIORITY CLAIM

This application is a continuation-in-part of International Patent Application No. PCT/DE2005/000843, filed May 4, 2005, which claims the benefit of priority of German Patent Application No. DE 10 2004 023 441.8, filed May 12, 2004, the contents of both of which are incorporated by reference in their entirety herein.

BACKGROUND

1. Technical Field

The invention relates to a system for regulation of the output power of a transmitter, in particular of a radio-frequency transmitter.

2. Background Information

Relatively large fluctuations may occur in the process parameters during the process of producing semiconductor components using CMOS technology. This variation may lead to severe fluctuations in the component characteristics of CMOS semiconductor components. For power amplifiers produced using CMOS technology, this leads to considerable variations in the output power. In this case, power differences of several dB typically occur particularly in radio-frequency transmitters, in which a modulated and amplified, radio-frequency transmission signal is produced from a modulation signal.

In addition, the characteristics of the semiconductor components vary based on temperature fluctuations, and for amplifiers, this leads to additional fluctuations in the output power. Analog controllers may be used to compensate for the temperature-dependent fluctuations of the component characteristics. However, CMOS semiconductor components have a highly complex temperature response, which necessitates a high degree of complexity to achieve satisfactory results. Furthermore, a controller such as this does not allow compensation for the fluctuations in the component characteristics that are caused by the production process.

In addition, a control loop may be provided in which the output power of an amplifier is measured, and its input signal regulated. If the load at the output of the amplifier is formed by a load which is not specified in any more detail, such as an unmatched antenna, then special precautions are required to reduce reaction effects on the power measurement, and these can lead to corrupted measurement results. By way of example, a directional coupler is required for this purpose, which must be arranged externally, that is to say not within the integrated circuit. This type of power measurement thus increases the number of components, which results in an increased space requirement, an increased current drawn by the overall apparatus, and in increased production costs.

A further option for compensation for the fluctuations in the component characteristics caused by the production process is to measure each transmission circuit individually after production, and to calibrate it in accordance with the measurement results. This option is not practicable, because of the excessively high costs.

BRIEF SUMMARY

A cost-effective apparatus and a method which involves little effort for regulation of the signal power of a transmitter is disclosed. In particular, a radio-frequency transmitter, which is able to compensate for signal power fluctuations caused by fluctuations in the component characteristics, is disclosed.

The invention makes use of the fact that the signal power can be determined indirectly by means of a voltage measurement, if the voltage is measured decoupled from the load.

A control loop includes a controlled module which produces an analog output signal, a voltage detector which produces a detector signal based on the analog output signal, an evaluation circuit which receives the detector signal and produces an evaluation signal, as well as an input amplification element for amplification of the input signal to the controlled system as a function of the evaluation signal. The transmitter includes a decoupling element, which is connected downstream from the control loop and decouples the output of the control loop from a downstream electrical load.

The decoupling element, whose output power is controlled by its input voltage, decouples the output of the control loop from the load which is connected downstream from the decoupling element and whose input impedance is in general unknown. The output power of the decoupling element can thus be determined in a simple manner by means of a voltage measurement at its input. The control loop can thus regulate the signal power at the output of the decoupling element on the basis of a single voltage measurement at the input of the decoupling element. There is no need for a complex power measurement of the signal for this purpose.

The disclosure may make it possible to readjust fluctuations in the signal power, without any reaction. In particular, fluctuations and scatters of the component characteristics which are caused by the production process and by temperature are readjusted, particularly for components in the controlled system. This makes it possible to effectively and simply counteract even major fluctuations in the component characteristics, such as those which occur, for example, in CMOS semiconductor components. The disclosure reduces the influence of process fluctuations on the output power without any negative influence on the overall current drawn.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
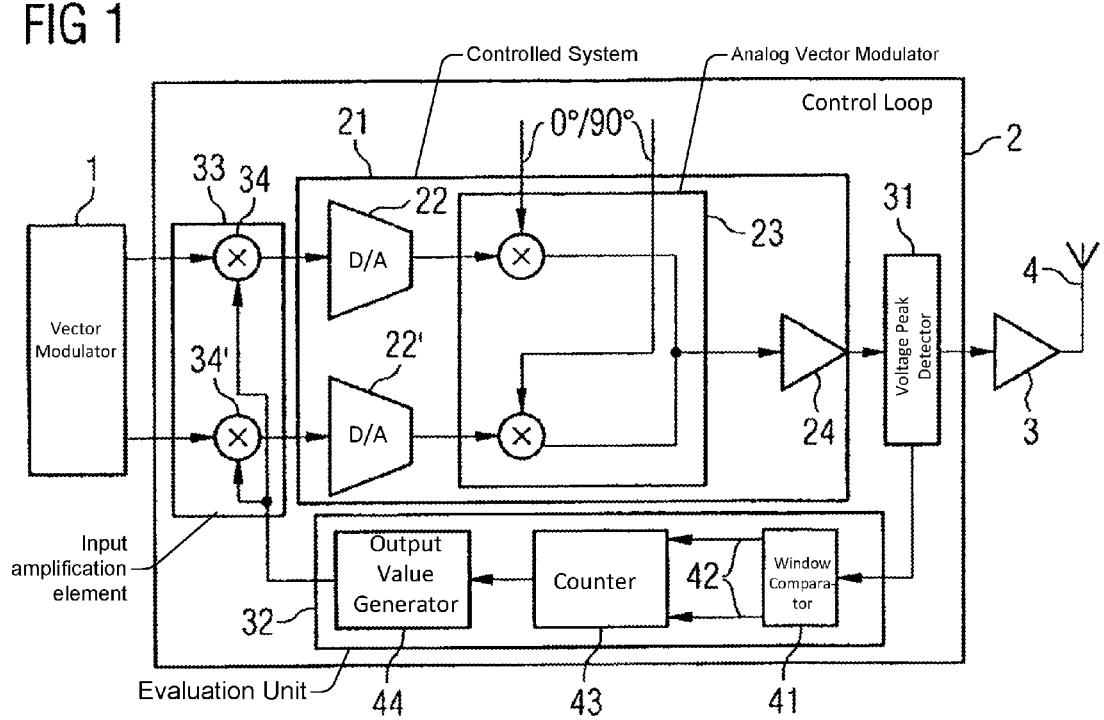
FIG. 1 is a schematic block diagram of an apparatus within a radio-frequency transmitter.

FIG. 1 shows a radio-frequency transmitter which converts the I and Q values of a modulation signal to an I and Q-modulated transmission signal, amplifies it, and emits it to an antenna 4. The radio-frequency transmitter comprises a digital vector modulator 1, a control loop 2 and a decoupling element 3, which has a known and essentially constant input impedance. The control loop 2 and the decoupling element 3 are located within one integrated circuit, and are produced using an identical semiconductor technology, for example CMOS technology. Further amplifier elements (not illustrated) can be connected to the decoupling element 3, and are likewise located on the integrated circuit, or arranged externally to it.

The digital vector modulator 1 passes digital I and Q values to the control loop which are converted, by two digital/analog converters 22, 22' within the controlled system 21, to two analog signals. The two analog signals are passed to an analog vector modulator 23. A local oscillator produces a radio-frequency carrier signal as well as a version of the carrier signal which has been phase-shifted through 90°. In the analog vector modulator 23, the two radio-frequency signals are multiplied by the two analog signals from the digital/analog converters 22, 22', and are mixed to form an I/Q-modulated transmission signal. The transmission signal is amplified in a preamplifier 24, and is passed to the decoupling element 3.

The decoupling element 3 comprises an amplifier element. In particular, the preamplifier 24 together with the decoupling element 3 forms a multiple-stage amplifier, whose last stage represents the decoupling element 3. The regulation mechanism comprises a voltage peak detector 31, an evaluation circuit 32 and an input amplification element 33. The voltage peak detector 31 determines the magnitude of the voltage peaks in the radio-frequency transmission signal at the input of the decoupling element 3, and/or in the drive for the last stage of the multiple-stage amplifier 24, 3, and passes the measurement or detector signal to the evaluation circuit 32. The evaluation circuit 32 produces a digital evaluation signal in the form of an output value 44, which is passed to the input amplification element 33. In the input amplification element 33, the digital input signals to the control loop, the I and Q values of the modulation signal, are multiplied by the digital evaluation signal (that is to say the output value 44) in multiplication units 34, 34'. The output signals from the two digital/analog converters 22, 22' are thus amplified uniformly, as a result of which the analog vector modulator 23 emits a correspondingly amplified transmission signal to the preamplifier 24, and the radio-frequency transmitter emits a correspondingly amplified output signal to the transmission antenna 4.

The frequency at which the voltage peak detector 31 emits a measurement signal to the evaluation circuit 32 is variable. The voltage peak detector 31 may emit only one measurement signal per transmitted data unit, in particular per transmitted data burst. The measurement signal is thus a measure of the transmission power of the overall data burst. Since only one power matching process takes place per transmitted data burst, and the integration time of the voltage peak detector 31 is thus considerably longer than the duration of the power fluctuation which results from amplitude modulation, the transmitter may also be used for power regulation of amplitude-modulated signals.

The evaluation circuit 32 comprises a window comparator 41 which receives the measurement signal from the voltage peak detector 31. The window comparator 41 checks whether the detector signal is within a nominal window, which is defined by an upper and a lower comparison voltage. If the detector signal overshoots or undershoots the nominal window, then the window comparator 41 sends a decrementing or incrementing signal 42, respectively, to a counter 43, whose count is thus respectively decremented or incremented.

The digital evaluation signal or the output value 44 is determined on the basis of the count of the counter 43. A new output value 44 is determined such that the signal power is varied in defined steps, for example in steps of 1.5 to 2 dB. The determination of the new output value 44 can include a weighting, which takes account of the last stage 3 (which is located outside the controlled system) of the multiple-stage amplifier 24, 3 and of the decoupling element 3. Furthermore, a self-trimming process can be carried out when an external amplifier is provided downstream from the decoupling element 3.

The output value 44 can be determined on a software or hardware basis by a process controller (not illustrated). In the simplest case, the count is added to an initial output value for this purpose, and the sum itself or a value calculated from it (for example in a suitably weighted form) is emitted as the output value 44. The initial output value may be stored in a non-volatile memory component, so that it is possible to provide a good estimate of the output value 44, even at the start. The count at the start may be about zero. Other algorithms for determination of the output value may also be provided. For example, the output value can also be determined based on the multiplication of the count by a predetermined weighting factor.

In one example system, the possible output values 44 are stored in a non-volatile memory component (not illustrated). The non-volatile memory component may comprise a ROM table. The stored output values 44 are then already weighted with respect to the decoupling element 3, which is located outside the controlled system, as well as possibly further amplifier modules which are connected downstream from the decoupling module 3, and/or are matched to them. The current count of the counter 43 determines which entry is selected from the ROM table. When the count is decremented or incremented, then the next-lower or the next-higher output value 44 is selected from the non-volatile memory component (such as, for example, the ROM table), and is emitted to the input amplification element 33. The determination of the output value 44 based on the ROM table can also be combined with software-based control.

In another system, the output value 44 and/or the information on which output value 44 was most recently used and which output value should be used at the start are/is stored in a non-volatile memory component, to provide an estimate of the output power for restarting.

Figure 2:
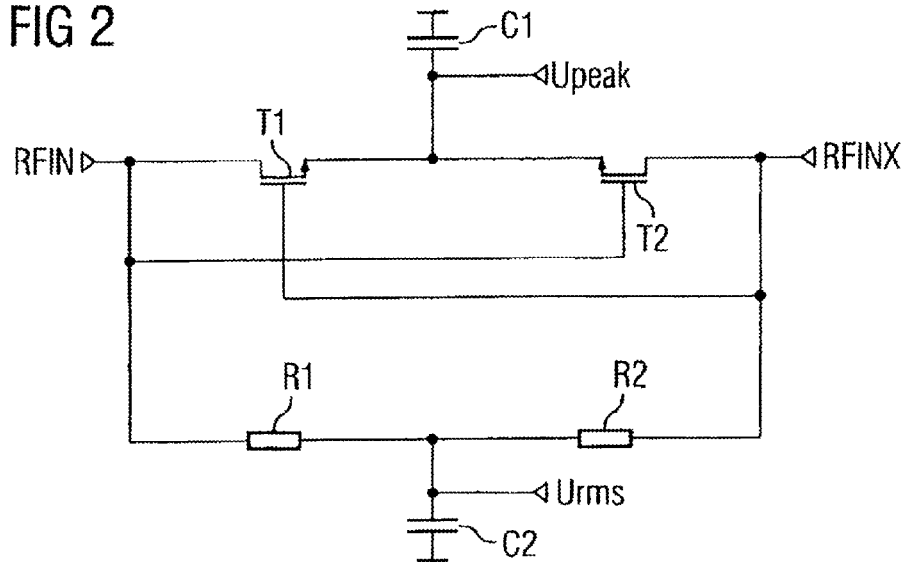
FIG. 2 illustrates an example voltage peak detector.

FIG. 2 shows an example voltage peak detector 31 with cross-coupled CMOS transistors T1, T2. The differential, analog output signal from the controlled system is injected via the connections RFIN, RFINX into the voltage peak detector 31. During the respective positive and negative half-cycles of the radio-frequency signal, the drain-source paths through the two transistors T1, T2 are switched on alternately, as a result of which the capacitor C1 is charged, and the peak voltage $U_{peak}$ can then be tapped off. Furthermore, the common-mode signal $U_{rms}$ is required for voltage measurement in the case of differential radio-frequency signals. This is done by the low-pass filter R1 or R2 and C2. The measurement or detector signal which the voltage peak detector 31 emits to the evaluation circuit 32 may comprise the two measurement values $U_{peak}$ and $U_{rms}$.

It is therefore intended that the foregoing detailed description be regarded as illustrative rather than limiting, and that it be understood that it is the following claims, including all equivalents, that are intended to define the spirit and scope of this invention.

The invention claimed is:

1. An apparatus that regulates a signal power of a transmitter, comprising:
a decoupling module configured to receive an RF signal at an input of the decoupling module and to communicate the RF signal to a downstream load;
a voltage detector connected between a controlled module and the decoupling module, and configured to receive an RF signal from the controlled module at an input of the voltage detector, wherein the voltage detector is configured to output a measurement signal associated with a magnitude of voltage peaks in the RF signal received at the input of the voltage detector prior to the RF signal reaching the decoupling module to an output of the voltage detector, and wherein the voltage detector further passes the RF signal to the input of the decoupling module;
an evaluation circuit configured to receive the measurement signal from the output of voltage detector and to produce an evaluation signal, wherein the evaluation circuit comprises a window comparator that receives the measurement signal, wherein the window comparator is configured to compare the measurement signal to an upper voltage threshold and a lower voltage threshold, wherein the upper and lower voltage thresholds are different and define a nominal window of the window comparator, and wherein the window comparator is configured to output a decrementing signal when the detector signal exceeds the upper voltage threshold and output an incrementing signal when the measurement signal falls below the lower voltage threshold, wherein the evaluation signal is a function of the decrementing signal or the incrementing signal; and
an input amplification module operable to amplify an input signal to the controlled module based on the evaluation signal.

2. The apparatus of claim 1, wherein the decoupling module comprises an amplifier module.

3. The apparatus of claim 2, wherein the signal power at the output of the input amplification module depends on a voltage at its input.

4. The apparatus of claim 3, wherein the signal power depends linearly on the voltage at the input of the amplified module.

5. The apparatus of claim 1, wherein the output signal from the controlled module comprises an AC voltage signal.

6. The apparatus of claim 5, wherein the AC voltage signal comprises a radio-frequency signal.

7. The apparatus of claim 5, wherein the voltage detector comprises a voltage peak detector.

8. The apparatus of claim 7, wherein the voltage peak detector comprises cross-over CMOS transistors.

9. The apparatus of claim 1, wherein the apparatus is arranged within one integrated circuit.

10. The apparatus of claim 1, wherein the evaluation circuit is operable to emit a digital evaluation signal as the evaluation signal.

11. The apparatus of claim 10, wherein the input signal to the controlled module comprises a digital input signal, and the input amplification module comprises a multiplication unit operable to logically link the digital evaluation signal with the digital input signal.

12. The apparatus of claim 11, wherein the digital input signal comprises I and Q values of a modulation signal, and the analog output signal comprises an I/Q-modulated transmission signal.

13. The apparatus of claim 1, wherein the evaluation circuit comprises a counter, to which the window comparator is operable to emit at least one of the decrementing signal or the incrementing, thus decrementing or incrementing, respectively, a count of the counter.

14. The apparatus of claim 13, wherein the evaluation circuit comprises a non-volatile memory in which an initial output value is stored, and the determination of an output value of the digital evaluation signal comprises addition of the count of the counter to the initial output value.

15. The apparatus of claim 13, wherein the evaluation circuit comprises a non-volatile memory component, in which possible output values of the digital evaluation signal are stored, and in which one output value is selected based on the count.

16. The apparatus of claim 15, wherein the non-volatile memory component comprises a ROM table.

17. The apparatus of claim 1, wherein the controlled module comprises a digital analog converter operable to convert the input signal to the controlled module to an analog signal.

18. The apparatus of claim 1, wherein the controlled module comprises an analog vector modulator.

19. The apparatus of claim 18, wherein the vector modulator is manufactured with CMOS technology.

20. The apparatus of claim 1, wherein the controlled module comprises a preamplifier module.

21. The apparatus of claim 20, further comprising a multiple-stage amplifier including an amplifier stage, wherein the amplifier stage extends over the preamplifier module and over the decoupling module.

22. A radio-frequency transmitter, comprising:
a decoupling module configured to receive an RF signal at an input of the decoupling module and to communicate the RF signal to a downstream load;
a voltage detector connected between a controlled module and the decoupling module, and configured to receive an RF signal from the controlled module at an input of the voltage detector, wherein the voltage detector is configured to output a measurement signal associated with a magnitude of voltage peaks in the RF signal received at the input of the voltage detector prior to the RF signal reaching the decoupling module to an output of the voltage detector, and wherein the voltage detector further passes the RF signal to the input of the decoupling module;
an evaluation circuit configured to receive the measurement signal from the output of voltage detector and to produce an evaluation signal, wherein the evaluation circuit comprises a window comparator that receives the measurement signal, wherein the window comparator is configured to compare the measurement signal to an upper voltage threshold and a lower voltage threshold, wherein the upper and lower voltage thresholds are different and define a nominal window of the window comparator, and wherein the window comparator is configured to output a decrementing signal when the detector signal exceeds the upper voltage threshold and output an incrementing signal when the measurement signal falls below the lower voltage threshold, wherein the evaluation signal is a function of the decrementing signal or the incrementing signal; and an input amplification module operable to amplify an input signal to the controlled module based on the evaluation signal.

23. A method for regulating a signal power of a transmitter, including a control loop, the method comprising:
producing an RF signal by a controlled module;
receiving, by a voltage detector, the RF signal;
communicating, by the voltage detector, the RF signal to an input of a decoupling module, wherein the voltage detector is connected between the controlled module and the decoupling module;
communicating, by the voltage detector, a measurement signal, wherein the voltage detector detects a magnitude of voltage peaks in the RF signal before the RF signal reaches the decoupling module to generate the measurement signal;
receiving the measurement signal, by an evaluation circuit;
producing an evaluation signal, by the evaluation circuit, wherein the evaluation circuit comprises a window comparator, wherein receiving the measurement signal comprises receiving the measurement signal by the window comparator, and wherein producing the evaluation signal comprises:
comparing the measurement signal to an upper voltage threshold and to a lower, different voltage threshold that together define a nominal window of the window comparator;
emitting a decrementing signal or incrementing signal to a counter, by the window comparator, when the measurement signal exceeds the upper voltage threshold or falls below the lower voltage threshold, respectively; and
decrementing or incrementing, respectively, a count of the counter based on the decrementing signal or the incrementing signal, respectively, wherein the evaluation signal is a function of the count;
amplifying an input signal to the controlled module as a function of the evaluation signal, by an input amplification module; and
decoupling the RF signal from the controlled module from a downstream load, by the decoupling module.

24. The method of claim 23, wherein decoupling the analog output signal comprises decoupling with the decoupling module including an amplifier which emits a signal power that depends linearly on the voltage at its input.

25. The method of claim 23, wherein the method is configured to be performed within one integrated circuit.

26. The method of claim 23, further comprising emitting a digital evaluation signal, by the evaluation circuit.

27. The method of claim 26, wherein the input signal to the controlled module comprise a digital input signal, and the input amplification module comprises a multiplication module operable to logically link the digital evaluation signal with the digital input signal.

28. The method of claim 23, further comprising determining an output value of the digital evaluation signal from the evaluation circuit based on the count.

29. The method of claim 28, further comprising storing an initial output value in a non-volatile memory component, and wherein determining the output value comprises adding the count of the counter to the initial output value.

30. The method of claim 28, further comprising storing possible output values of the digital evaluation signal in a non-volatile memory element; and selecting an output value based on the count.

31. The method of claim 30, wherein the non-volatile memory element comprises a ROM table.

32. The method of claim 23, wherein the digital input signal comprises I and Q values of a modulation signal, and the analog output signal comprises an I/Q-modulated transmission signal.

33. An apparatus for regulating a signal power of a transmitter, including a control loop, comprising:
an RF signal generator circuit;
a voltage detection circuit connected between a controlled circuit and a decoupling circuit, configured to receive the RF signal from the controlled circuit and communicate the RF signal to an input of the decoupling circuit, and further configured to communicate a measurement signal associated with a magnitude of voltage peaks in the RF signal measured prior to the RF signal reaching the decoupling circuit;
an evaluation circuit configured to receive the measurement signal and produce an evaluation signal based on the measurement signal, wherein the evaluation circuit comprises a window comparator circuit configured to receive the measurement signal, wherein the window comparator circuit is configured to compare the measurement signal to an upper voltage threshold and to a lower voltage threshold, wherein the upper and lower voltage thresholds are different and define a nominal window of the window comparator circuit, and wherein the window comparator circuit is configured to output a decrementing signal when the measurement signal exceeds the upper voltage threshold and output an incrementing signal when the measurement signal falls below the lower voltage threshold, wherein the evaluation signal is a function of the decrementing signal or the incrementing signal;
an amplifying circuit configured to amplify an input signal that operates to form the RF signal in the RF signal generator circuit as a function of the evaluation signal, wherein the decoupling circuit configured to decouple the RF signal from a downstream load.

34. The apparatus of claim 33, wherein the decoupling circuit is further configured to emit a signal power that depends linearly on the voltage at its input.

35. The apparatus of claim 33, wherein the apparatus is configured to be performed within one integrated circuit.

36. The apparatus of claim 33, further comprising a digital evaluation signal emitting circuit.

37. The apparatus of claim 36, wherein the input signal comprises a digital input signal, and the amplifying circuit is further configured to logically link the digital evaluation signal with the digital input signal.

38. The apparatus of claim 33, further comprising a signal emitting circuit configured to emit the decrementing signal or incrementing signal to a counter, by the comparator circuit when the detector signal overshoots or undershoots the nominal window; and wherein the signal emitting circuit is further configured to decrement or increment, respectively, a count of the counter based thereon.

39. The apparatus of claim 38, further comprising an output value determination circuit configured to determine an output value of the digital evaluation signal based on the count.

40. The apparatus of claim 39, further comprising an output value storage circuit, and the output value determination circuit is further configured to add the count of the counter to the initial output value.

41. The apparatus of claim 40, wherein the output value storage circuit is further configured to store possible output values of the digital evaluation signal; and further comprising an output value selection circuit configured to select an output value based on the count.

42. The apparatus of claim 33, wherein the digital input signal comprises I and Q values of a modulation signal, and the analog output signal comprises an I/Q-modulated transmission signal.

* * * * *